May 8, 1945. J. L. RAY 2,375,494
PIPE JOINT
Filed Dec. 24, 1942 2 Sheets-Sheet 2
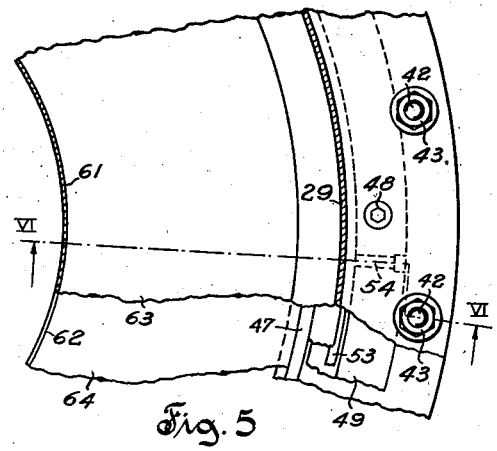
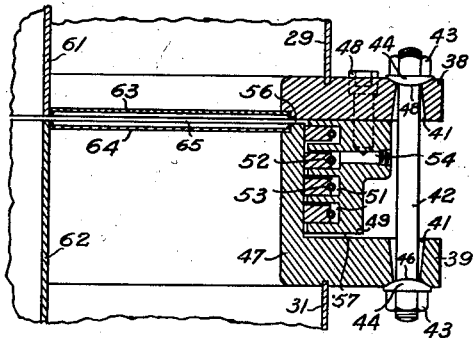

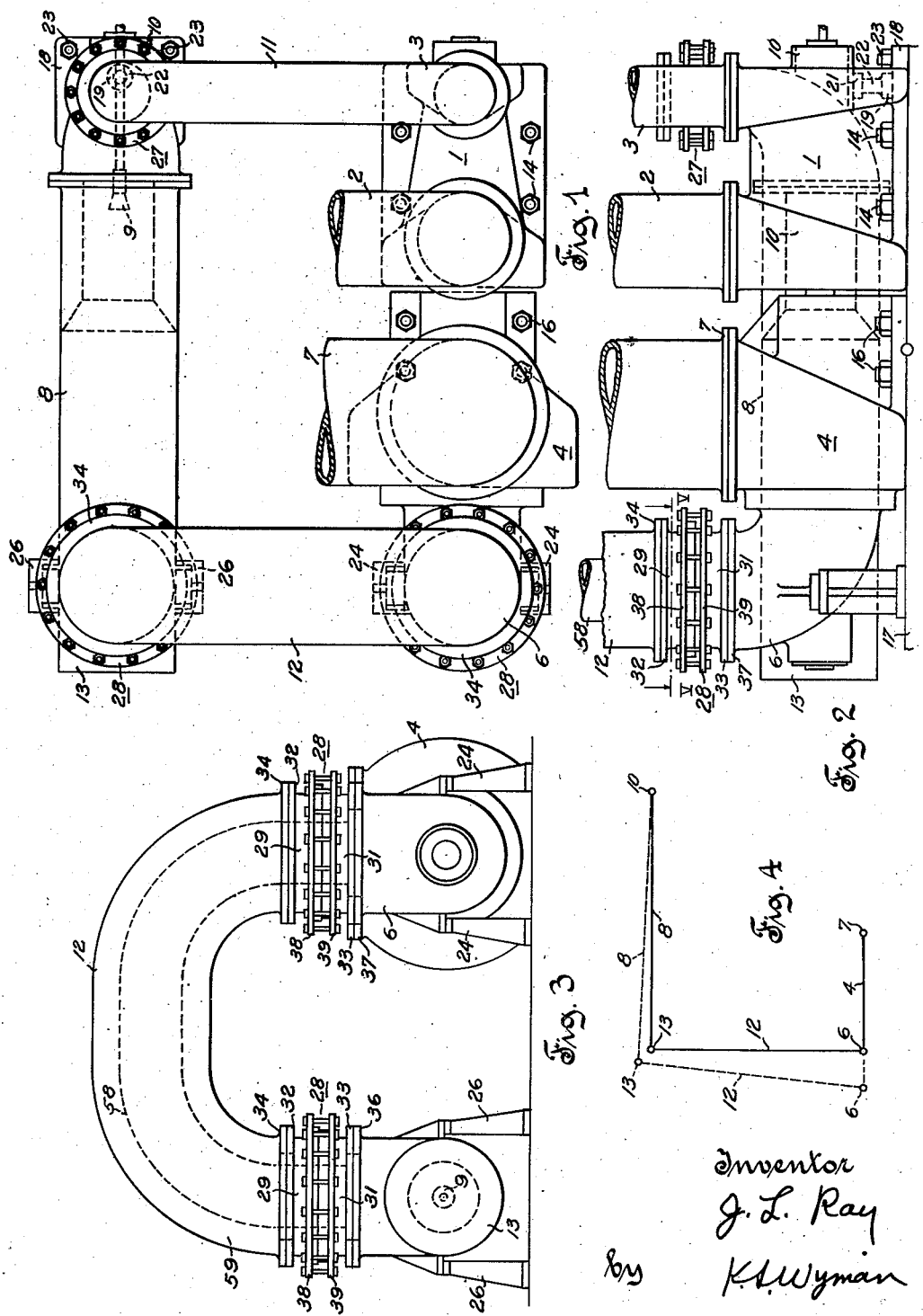

Patented May 8, 1945

2,375,494

UNITED STATES PATENT OFFICE 2,375,494

PIPE JOINT

James L. Ray, Elm Grove, Wis., assignor to Allis-Chalmers Manufacturing Company, Milwaukee, Wis., a corporation of Delaware Application December 24, 1942, Serial No. 469,983

5 Claims. (Cl. 285—130)

This invention relates generally to high temperature elastic fluid conductors and more particularly to a swing joint construction interconnecting the adjacent ends of conductors or other elements for relative angular movement about a common axis.

The invention is particularly applicable, although in no manner limited, to combustion gas turbine systems in which the motive fluid conductor or conductors are subjected to extremely high and rapidly changing temperatures. The swing joint constructions heretofore commonly employed under such conditions usually embody relatively movable, massive parts which are subjected to a bending action produced by the relative expansion of such parts in response to extreme and rapid variations in temperature and as a result, said parts and the conductors connected thereto are frequently overstressed, sometimes to the point of failure. In any event, such frequent overstressing of parts is conducive to failure, and it is therefore the primary object of this invention to provide an improved swing joint construction which is relatively light and extremely durable and which is operative without overstressing interconnected and relatively movable parts when subjected to extremely high and rapidly changing temperatures irrespective of the extent of temperature change.

In accordance with this invention, the above stated object and/or features thereof may be accomplished by a construction embodying a pair of spaced coaxial elements each adapted for connection with the end of a fluid conductor, tensive means pivotally interconnecting said elements for relative movement axially of and angularly about a common axis, an annular sealing surface on one of said members, and an annular sealing means engaging said sealing surface. This simplified construction materially reduces manufacturing, installation and replacement costs and therefore another object of this invention is to provide a swing joint construction embodying one or more of the improvements hereinbefore set forth.

The invention accordingly consists of the various features of construction, combinations of elements and arrangements of parts as is more fully set forth in the appended claims and in the detailed description; reference being had to the accompanying drawings, in which:

Fig. 1 is a plan view of a gas turbine system necessitating and embodying swing joint connections;

Fig. 2 is a partial side view of the system shown in Fig. 1;

Fig. 3 is an end view of the system shown in Fig. 1;

Fig. 4 diagrammatically illustrates the relative displacement of the interconnected elements effected by the longitudinal expansion thereof;

Fig. 5 is a partial section taken on line V—V of Fig. 2 with parts broken away to better illustrate a swing joint construction embodying the invention;

Fig. 6 is a partial section taken on line VI—VI of Fig. 5;

Fig. 7 is a partial section similar to Fig. 5 illustrating a modified construction;

Fig. 8 is a partial section taken on line VIII—VIII of Fig. 7;

Fig. 9 is a partial section similar to Fig. 5 illustrating still another modified construction; and Fig. 10 is a partial section taken on line X—X of Fig. 9.

Referring to Figs. 1-3 inclusive of the drawings, it is seen that a gas turbine system embodying the invention may include a compressor 1 having air inlet and discharge connections 2 and 3, respectively, a gas turbine 4 drivingly connected with said compressor and having inlet and exhaust connections 6 and 7, respectively, an elongated combustion chamber 8 having a fuel burner 9 in the end 10 thereof, a conduit means 11 connecting the discharge 3 of said compressor with the burner end 10 of the combustion chamber 8 for supplying air thereto, and a conduit means 12 connecting the opposite or discharge end 13 of the combustion chamber 8 with the intake 6 of the turbine 4 for supplying motive fluid thereto. The compressor 1 and the exhaust end of the turbine 4 are fixedly secured by any suitable means such as the bolts 14 and 16, respectively, to a stationary foundation or the like 17 as best shown in Fig. 2. The burner end 10 of the combustion chamber 8 is pivotally mounted on a base member 18 for angular movements relative thereto by means of opposed bosses 19 and 21 and a pin member 22; the base member being in turn fixedly secured to the foundation 17 by any suitable means such as bolts 23, thereby preventing a longitudinal movement of the burner end of said combustion chamber. The inlet end of the turbine and the discharge end 13 of the combustion chamber are slidably mounted on pedestal members 24 and 26, respectively, which are in turn fixedly secured to the foundation 17 by any suitable means (not shown).

The burner end 10 of the conduit means 11 embodies therein a swing joint connection 27 permitting the hereinabove specified angular movements of the combustion chamber 8; the opposite end of the conduit means 11 being fixed to the compressor discharge 3 and if desired said conduit means may embody therein a flexible portion (not shown) permitting longitudinal expansion and contraction thereof relative to the compressor 1 and the swing joint connection 27. Both ends of the conduit means 12 include a swing joint connection 28 permitting angular movements of the conduit means 12 relative to the discharge end 13 of the combustion chamber 8 and relative to the inlet connection or end 6 of the turbine 4. The burner end 10 of the combustion chamber 8 can move angularly but not longitudinally and the discharge end 7 of the turbine 4 cannot move either angularly or longitudinally. Consequently, longitudinal expansion of the combustion chamber 8, of the conduit means 12 and of the turbine 4 will effect a displacement of the elements similar to that illustrated to an exaggerated degree by the dotted lines in Fig. 4, in which like numerals are used to designate the corresponding elements and in which the full lines represent the cold positions of the elements, and it should therefore be obvious that such a displacement of the various elements necessitates the use of the swing joint connections 27 and 28, as hereinbefore indicated, in order to prevent overstressing of interconnected parts.

Referring also to Figs. 5 and 6, it is seen that the swing joint connections 28 which are preferably identical in construction, may comprise a pair of spaced coaxial elements 29 and 31 having their remote ends provided with flanges 32 and 33, respectively, adapted for connection with the flanged ends 34 of the conduit means 12 and with flanges 36 and 37 on the discharge end 13 of the combustion chamber 8 and on the inlet 6 of the turbine 4, respectively. The adjacent ends of elements 29 and 31 are provided with axially spaced flanges 38 and 39, respectively, having pairs of alined openings 41 therein; said elements being pivotally interconnected for relative angular movement by means of tensive members such as bolts 42 which extend through the pairs of alined openings 41 and are held against the outer surfaces of the flanges 38 and 39 by nuts 43 having convex underside surface portions 44 seated in complementary concave depressions 46 formed about the openings 41. The flange 39 has a coaxially extending collar portion 47 which is spaced from the adjacent side of the flange 38 and the flange 38 has removably secured thereon, as by means of cap screws 48, a surrounding sealing member 49 having on its inner surface a plurality of axially spaced grooves 51 in which are disposed carbon seal rings 52 and snap rings 53 acting to hold the carbon rings 51 in engagement with the collar portion 47 on the flange 39. The grooves 51 are preferably made of greater axial width than the carbon rings 52 in order to prevent the rings from sticking in said grooves and the member 49 is also provided with a radially extending air admission duct 54 which terminates in one of said grooves (preferably the second one from the flange 38) so that air forced through said duct at a pressure equal to or higher than that of the motive fluid will act to position and maintain the upper ring 52 in the position shown in Fig. 6, thereby causing the major portion of the air to flow past the upper seal ring and into the space 56 provided between the upper end of collar 47 and the underside of the flange 38. The remainder of the air may flow or leak around the remaining seal rings and pass to atmosphere through the space 57 provided between the underside of the member 49 and the upper side of the flange 39.

The combustion gases passing through the conduit means 12 are extremely hot and in order to prevent unnecessary heat losses and to maintain the outer wall of the conduit means within safe temperature limits, said means usually embodies a lining 58 as indicated in Figs. 2 and 3; said lining forming with the outer wall an insulation or cooling fluid receiving space 59. Consequently, when the swing joint connections are embodied in conduit means of this type, the swing joint is also provided with a similar continuing lining structure which, in the illustrated construction, comprises axially spaced lining sections 61 and 62 secured to the flanges 38 and 39, respectively, of the elements 29 and 31 by any suitable means such as the axially spaced annular disks 63 and 64. The space 65 provided between the disks 63 and 64 places the motive fluid passage defined by the inner surface of sections 61 and 62 in communication with the space 56. The opposite ends of the lining sections 61 and 62, which are not shown in the interest of simplicity, may, if desired, be connected with the flanged portions 32 and 33 of the elements 29 and 31, respectively, in the same manner as just described with respect to the other ends thereof.

In operation, the expansion of the turbine 4 and the expansion and displacement of the conduit means 12 and the combustion chamber 8 effect a relative angular movement of the elements 29 and 31 comprising the swing joint connections 28, such movement being effected without materially stressing interconnected parts due to what is in effect the spherical seating connection between the tensive members, that is, the bolts 42, and the flanges 38 and 39, and due to the alined openings 41 being of greater diameter than the bolts 42, which permits tilting of the tensive members circumferentially relative to the flanges 38 and 39. In other words, the flanges 38 and 39 of elements 29 and 31, respectively, are in effect provided with pairs of axially spaced pivot supports (the pairs of oppositely facing depressions 46), and the tensive members (bolts 42) each has opposite end portions (the convex surfaces 44) mounted to pivot on a pair of supports in response to a relative movement of the elements 29 and 31 axially of or angularly about a common axis. A relative angular movement of the elements 29 and 31 results in a tilting movement of the tensive members and consequently an axial movement of said elements toward or away from each other depending upon the position of said elements and tensive members when such relative movement occurs; said axial movement and the longitudinal expansion and contraction of said elements being permitted by the flanges 38 and 39 thereof being axially spaced apart as shown. In this connection, it should also be noted that the sealing means comprising the collar portion 47, the sealing member 49 and carbon rings 52 permit both an angular and an axial movement of the elements 29 and 31 and are continually effective during such movements.

The modified construction shown in Figs. 7 and 8 differs from that just described only in the manner of effecting a seal between the relatively movable elements comprising the swing joint, and, consequently, like numerals have been used to designate corresponding parts in the interest of simplicity. In this connection, it should be noted that the flanges 38 and 39 of elements 29 and 31, respectively, are provided with axially spaced opposed surfaces, one of which, 66, constitutes a sealing surface and the other of which, 67, has formed therein radially spaced concentric grooves 68 in which are disposed carbon seal rings 69 and a series of compression springs 71 acting to hold the carbon rings in continuous engagement with the sealing surface 66. Additional sealing means is also provided by means of an axially extending air admission duct 72 which is formed in the flange 39 and which terminates in a circumferential groove 73 formed in the surface 66 between the portions thereof engaged by the carbon rings 69. The surface 67 being preferably provided with an opposed groove 74 which coacts with the groove 73 and aids in distributing the incoming air throughout the space between the rings 69. This modified construction affords all of the advantages particularly pointed out with respect to the construction illustrated by Figs. 5 and 6, and a further description in this connection is deemed unnecessary for a complete understanding of the invention.

The modified construction illustrated by Figs. 9 and 10, in which like numerals have been used to designate corresponding parts, is a departure from that shown in Figs. 7 and 8 in that a different means is employed for effecting a seal between the relatively movable elements comprising the swing joint, and in that said elements are pivotally interconnected for relative angular and axial movements by a different type of tensive member. In this connection, it should be noted that the flanges 38 and 39 of elements 29 and 31, respectively, are provided with axially spaced opposed sealing surfaces 76 and 77, respectively, between which is disposed an annular bellows type sealing means formed by axially spaced flexible disks 78 and 79 welded or otherwise secured together at their inner and outer edges to form therebetween a pneumatically sealed chamber 81 into which a fluid such as air under pressure may be introduced through an axially extending duct 82 formed in the flange 39 and an enlarged alined opening 83 formed in the disk 79. The flanges 38 and 39 of elements 29 and 31 may slide on the abutting surfaces of the disks 78 and 79, respectively, and the flexibility of said disks may be altered by varying the pressure of the fluid admitted to the sealed chamber 81 formed therebetween. In this modification, the tensive members interconnecting the flanges 38 and 39 of elements 29 and 31 comprise links 84 which may be pivotally connected with the flanges 38 and 39 by means of stud bolts 86 which extend through apertures 87 formed in said links adjacent the ends thereof and which have shoulders or enlarged portions 88 thereon, at least one of which is of less diameter than an aperture 87, thereby permitting a circumferential tilting of said links relative to the flanges 38 and 39 without effecting a binding or twisting action thereon. This modified construction also functions to effect all of the results and advantages particularly pointed out with respect to the construction illustrated by Figs. 5 and 6, and a further description in this connection is also deemed unnecessary for a complete understanding of the invention.

The swing joint connection designated 27 may embody the novel features of the constructions hereinbefore described and whether the connectors 27 and 28 are made similar or different is entirely immaterial. It is also immaterial whether the swing joint connections embody lining sections as herein shown and described as connections of this type embodying the invention may be employed in conduit systems where desired irrespective of whether said systems embody lined or unlined or jacketed conduits. In this connection, the conduit means 11 is shown as ordinary conduit since the temperature of the compressed air is usually too low to warrant lining or jacketing same. The invention is applicable to all types of conduit systems necessitating connections permitting relative angular and axial movement betweeen interconnected elements, and it should therefore be understood that although the invention has been shown and described in connection with a gas turbine system, it is not in any manner so limited and that it is not desired to limit the invention to the exact details of construction herein shown and described, as various modifications within the scope of the appended claims may occur to persons skilled in the art.

It is claimed and desired to secure by Letters Patent:

1. A swing joint construction adapted to connect the adjacent ends of alined fluid conductors for limited relative movement both axially of and angularly about a common axis incidental to their relative expansion and contraction while in use comprising opposed annular elements having parts coaxially disposed in proximate and in remote spaced relation with respect to each other and with respect to said common axis, a plurality of circumferentially spaced, axially extending members tensively connected with said remote parts for substantially free pivotal movement thereon as said elements move axially of or angularly about said common axis, and means for maintaining a sealing connection between said proximate parts of the elements irrespective of their relative displacement.

2. A swing joint construction adapted to connect the adjacent ends of alined fluid conductors for limited relative movement both axially of and angularly about a common axis incidental to their relative expansion and contraction while in use comprising opposed annular elements having parts coaxially disposed in proximate and in remote spaced relation with respect to each other and with respect to said common axis, a plurality of circumferentially spaced, axially extending members tensively connected with said remote parts for substantially free pivotal movement thereon as said elements move axially of or angularly about said common axis, a plurality of spaced rings for maintaining a sealing connection between said proximate parts of the elements irrespective of their relative displacement, and means for admitting fluid under pressure to the space between a pair of said rings.

3. A swing joint construction adapted to connect the adjacent ends of alined fluid conductors for limited relative movement both axially of and angularly about a common axis incidental to their relative expansion and contraction while in use comprising a pair of spaced coaxial annular elements presenting adjacent opposed surface portions, a series of circumferentially spaced tensive members each having opposite end portions interconnectingly mounted to pivot on remote opposed portions of said elements in response to a relative movement of the elements axially of or angularly about a common axis, and bellows type packing means sealingly connecting the adjacent opposed surface portions of said elements for relative movement axially of and angularly about said axis.

4. A swing joint construction adapted to connect the adjacent ends of alined fluid conductors for limited relative movement both axially of and angularly about a common axis incidental to their relative expansion and contraction while in use comprising a pair of spaced coaxial annular elements, a series of circumferentially spaced tensive members each having opposite end portions interconnectingly mounted to pivot on remote opposed portions of said elements in response to a relative movement of the elements axially of or angularly about a common axis, means carried by one of said elements defining a coaxial sealing surface, and a coaxial skirt portion carried by the other of said elements and having its free end portion telescopically engaging said sealing surface.

5. A swing point construction adapted to connect the adjacent ends of alined fluid conductors for limited relative movement both axially of and angularly about a common axis incidental to their relative expansion and contraction while in use comprising a pair of spaced coaxial annular elements presenting axially spaced opposed peripheral portions having alined openings therethrough terminating in oppositely facing spherical recesses, interconnecting tensive members extending through the alined openings in said peripheral portions and having end portions provided with spherical seating surfaces mounted to pivot in said recesses in response to a relative movement of said elements axially of or angularly about a common axis, a coaxial sealing surface on one of said elements surrounded by said tensive members, and a coaxial skirt portion carried by the other of said elements and having its free end portion telescopically engaging said sealing surface.

JAMES L. RAY.